United States Patent
Kastinger et al.

(10) Patent No.: US 6,847,135 B2
(45) Date of Patent: *Jan. 25, 2005

(54) UNIPOLAR TRANSVERSE FLUX MACHINE

(75) Inventors: Guenter Kastinger, Gaggenau-Sulzbach (DE); Hartmut Krueger, Buehlertal (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/450,463

(22) PCT Filed: Dec. 11, 2001

(86) PCT No.: PCT/DE01/04628

§ 371 (c)(1),
(2), (4) Date: Nov. 12, 2003

(87) PCT Pub. No.: WO02/49187

PCT Pub. Date: Jun. 20, 2002

(65) Prior Publication Data

US 2004/0075357 A1 Apr. 22, 2004

(30) Foreign Application Priority Data

Dec. 13, 2000 (DE) .......................... 100 62 073

(51) Int. Cl.⁷ .......................... H02K 37/00; H02K 1/00
(52) U.S. Cl. ...................... 310/49 R; 310/216; 310/254
(58) Field of Search ................... 310/49 R, 216–218, 310/254, 178, 179, 182–183, 197, 51; 318/696, 685

(56) References Cited

U.S. PATENT DOCUMENTS

| 4,517,478 A | 5/1985 | Oudet |
| 4,518,883 A | 5/1985 | Oudet |
| 4,703,243 A | * 10/1987 | Ettelman et al. ............ 318/696 |
| 6,166,471 A | * 12/2000 | Kometani et al. .......... 310/198 |

FOREIGN PATENT DOCUMENTS

| JP | 61-69364 | 4/1986 |
| JP | 10-126982 | 5/1998 |

* cited by examiner

*Primary Examiner*—Tran Nguyen
(74) *Attorney, Agent, or Firm*—Ronald E. Greigg

(57) ABSTRACT

In a unipolar transverse flux machine, for its modular construction, at least one rotor module has two coaxial, ferromagnetic rotor rings, toothed with a constant tooth pitch over its outer circumference, and a unipolarly magnetized permanent magnet ring fastened between them, and as at least one stator module, concentric with it, has a number of yokelike stator poles corresponding to twice the number of teeth of the rotor module, the stator poles being offset from one another by a pole pitch ($\tau$) and with their two yoke legs facing the two rotor rings, with an air gap between them, and an annular coil. At least one pair of stator pole groups having the same number of stator poles is formed, and these groups are displaced relative to one another by an electrical angle $\alpha = 180°/v$, where $v$ is the ordinal number of the harmonic in the torque that is suppressed by this displacement.

20 Claims, 5 Drawing Sheets

UNIPOLAR TRANSVERSE FLUX MACHINE

CROSS REFERENCE TO RELATED APPLICATIONS

This application is a 35 USC 371 application of PCT/DE 01/04628 filed on Dec. 11, 2001.

BACKGROUND OF THE INVENTION

1. Field of the Invention

The invention is directed to an improved unipolar transverse flux machine.

2. Description of the Prior Art

One unipolar transverse flux machine, proposed in German Patent Disclosure DE 100 39 466.3, which was not published by the priority date of the present application, has the advantage of a simple modular construction, in which with an increasing number of modular units, each composed of one stator module and one rotor module, the concentricity of the machine is improved. With 1-phase and 2-phase machines, that is, with one or two modular units, the torque course exhibits a pronounced waviness, known as torque rippling.

In a microstepping control motor with a disk rotor (U.S. Pat. No. 4,629,916), it is known, by displacement of the position of symmetrical pole pitches, to reduce the harmonic content with respect to certain harmonics, or to suppress certain harmonics entirely. The amount a of the displacement in electrical degrees determines which one of the harmonics is suppressed and conforms to the equation $\alpha = \Pi/\nu$, where $\nu$ is the ordinal number of the suppressed harmonic.

In an identical known microstepping control motor (German Patent Disclosure DE 37 13 148 A1), first the radial center lines of the stator poles are spaced apart from one another by 360 electrical degrees, and as a result the highest efficiency is achieved. As a result, however, the proportion of torque dictated by harmonics is also maximized. To reduce the harmonic content, the stator poles are now offset individually and by various amounts from their center lines defined by the pole pitch, and the effect of the offset is calculated for each individual position, in terms of its effect on the outset torque, that is, on the magnitude of the resultant fundamental torque and of the proportion of harmonics.

SUMMARY OF THE INVENTION

The unipolar transverse flux machine of the invention has the advantage that as a result of the symmetrical displacement of the stator pole groups and the asymmetrical displacement of individual stator pole pairs that each belong to one magnetic circuit, the proportions of harmonics in the torque are extensively reduced, and as a result, even in a unipolar transverse flux machine with only one or two modular units, quite good concentricity is achieved. While the symmetrical displacement of the stator pole groups requires a number of stator poles that meets the condition $2^n$, where n is a whole number, the asymmetrical displacement of the stator pole pairs requires only an even number of stator poles.

Advantageous refinements of and improvements to the unipolar transverse flux machine are also possible.

BRIEF DESCRIPTION OF THE DRAWINGS

The invention is explained in further detail below in conjunction with the drawings, in which.

DESCRIPTION OF THE PREFERRED EMBODIMENTS

Figure 1:
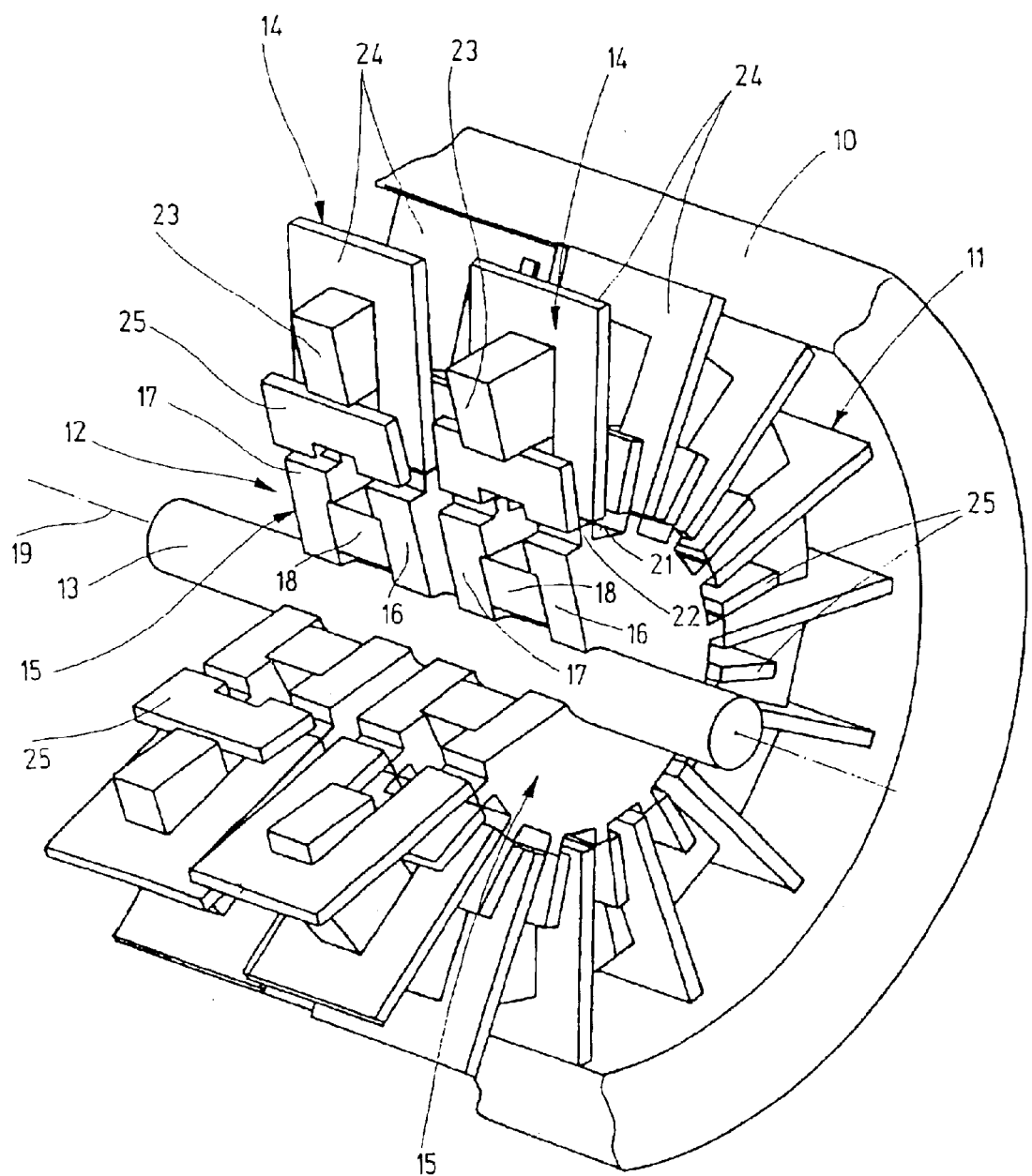
FIG. 1 is a perspective, fragmentary view of a 2-phase, 32-pole unipolar transverse flux machine, shown partly schematically.

In FIG. 1, a 2-phase, 32-pole unipolar transverse flux machine is shown in perspective and in fragmentary form. It has a machine housing 10, with a stator 11 mounted on it and with a coaxial rotor, which revolves in the stator 11 and is seated in a manner fixed against relative rotation on a rotor shaft 13 supported in the machine housing 10. The rotor 12 has two rotor modules 15, and the stator 11 has an equal number of stator modules 14. The rotor modules 15 are mounted axially in line with one another directly on the rotor shaft 13 in a manner fixed against relative rotation, and the stator modules 14 are secured axially in line with one another, in radial alignment with the associated rotor module 15, to the machine housing 10. The unipolar transverse flux machine, embodied here in a 2-phase version, can easily be designed with one phase or with three or more phases, by adding or subtracting one modular unit at a time, each modular unit comprising a stator module 14 and a rotor module 15.

The rotor module 15 comprises two coaxial, toothed, ferromagnetic rotor rings 16, 17, which are seated on the rotor shaft 13 in a manner fixed against relative rotation and which between them fasten a permanent magnet ring 18, which is magnetized unipolarly in the axial direction, that is, in the direction of the axis 19 of the rotor or stator. Each rotor ring 16, 17 is toothed on its outer circumference, remote from the rotor axis 19, with a constant tooth pitch, so that the teeth 22, separated from one another by a respective tooth gap 21, of the resultant rows of teeth have the same rotational angle spacing from one another. The teeth 22 on the rotor ring 16 and on the rotor ring 17 are aligned axially with one another. The rotor rings 16, 17, with their integrally formed-on teeth 22, are laminated and are preferably composed of identical stamped sheet-metal blanks that contact one another in the axial direction.

The stator module 14, concentrically surrounding the rotor module 15 with radial spacing, leaving air gaps, has an annular coil 23, which is coaxial with the rotor axis 19, and U-shaped, yokelike stator poles 24, 25 fitting longitudinally over the annular coil 23. One magnetic circuit each is closed via one stator pole 24, one stator pole 25, and one tooth 22 of the rotor 12; the stator poles 24 fit with their yoke legs over the annular coil 23, and the stator poles 25 with their yoke leg are located radially below the annular coil 23, which is why the stator poles 24 have long yoke legs and the stator poles 25 have short yoke legs. The likewise laminated stator poles 24, 25, put together from stamped metal sheets to form lamination packets, are fixed here to the machine housing 10 with a pole pitch τ that corresponds to half the tooth pitch of the rotor module 15. The stator poles 24, 25 are disposed such that one yoke leg of each is radially aligned with one rotor ring 16, and the other yoke leg is aligned with the other rotor ring 17 of the associated rotor module 12, and the free face ends of the yoke legs, which form pole faces, each face the respective rotor ring 16 and 17 with a radial air gap spacing.

As can be seen in FIG. 1, in the 2-phase version of the unipolar transverse flux machine, the two stator modules 14, disposed axially side by side in the machine housing 10, of the two modular units are rotated by 90 electric degrees from one another, which is equivalent to half of one pole pitch τ. In 32-pole version of the machine shown in FIG. 1, the offset angle in the direction of rotation is thus a space angle of 5.625°. Alternatively, it is possible for both stator modules 14 to be oriented in alignment with one another in the axial direction, and for the rotor modules 15 seated on the rotor shaft 13 to be rotated relative to one another by the aforementioned electrical angle of 90°, that is, the space angle of 5.625°.

To improve the concentricity of the 2-phase machine in FIG. 1, provisions are now made for reducing the harmonic content of the resultant total torque that can be drawn from the machine, which is expressed in so-called torque rippling, or to force it below a requisite amount. These provisions will now be described in terms of a modular unit of the kind shown schematically in a top view in FIG. 2. The second modular unit that can be seen in FIG. 1 is then modified in the same way.

Figure 2:
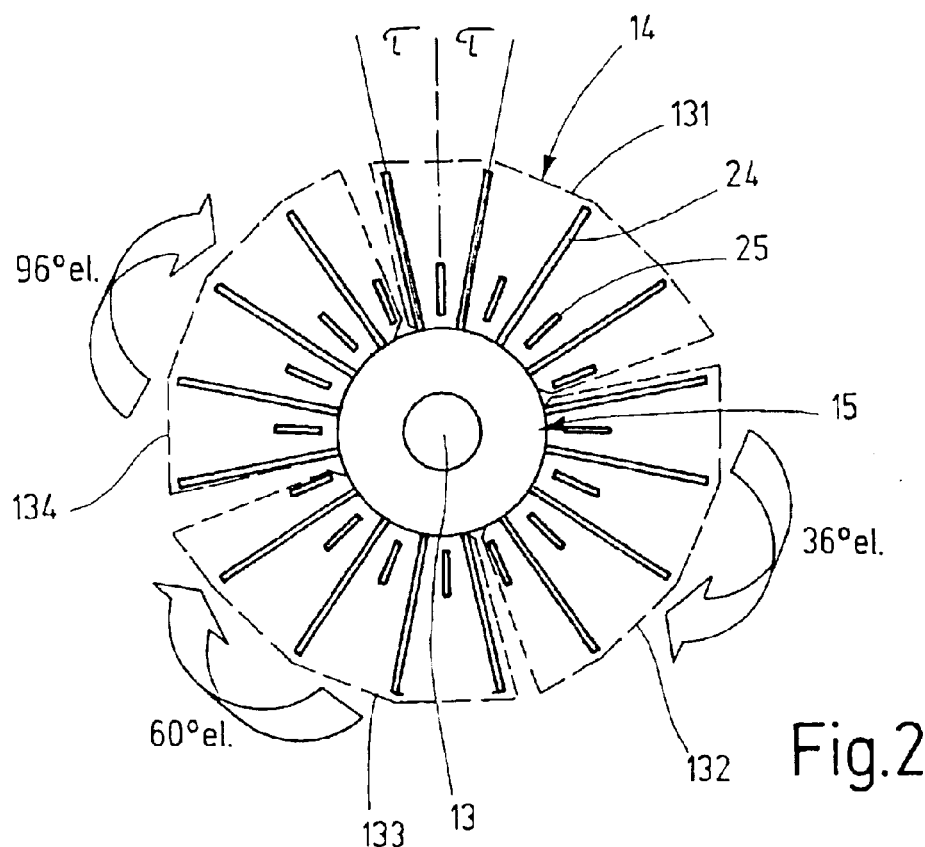
FIG. 2, a schematic top view of a modular unit of the unipolar transverse flux machine of FIG. 1.

As schematically indicated in FIG. 2, from the $2^n$, where n=5, stator poles 24, 25 that are present in each stator module 14, a plurality of identical stator pole groups 131–134 are formed, which have an equal number of stator poles 24, 25. In the exemplary embodiment of FIG. 2, four stator pole groups 131–134 are formed, each with eight stator poles 24, 25. In principle, the number of stator pole groups is $k=2^m$, where m is the number of harmonics in the torque that are suppressed. These k stator pole groups form m·k/2 pairs of stator pole groups, and each stator pole group 131–134 belongs to m pairs. The stator pole groups belonging to one pair of stator pole groups are displaced from one another by an electrical angle α=180°/ν, where ν is the ordinal number of the particular harmonic in the torque that is to be suppressed.

Figure 3:
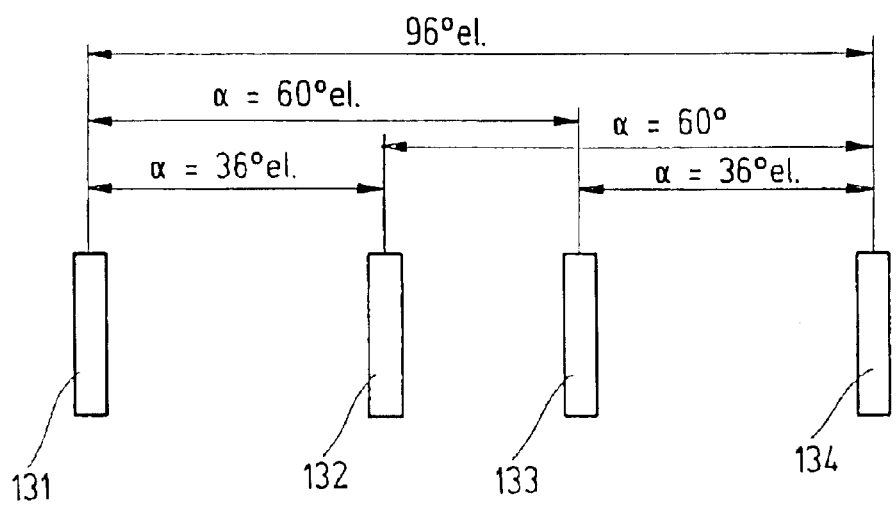
FIG. 3, a diagram showing the disposition of the stator pole groups in the stator module of FIG. 2, to explain their displacement.

In the exemplary embodiment shown in FIGS. 2–7, the amplitude spectrum of the torque of the uncompensated machine, that is, the machine embodied as in FIG. 1, in which the stator pole groups are not displaced but instead all the stator poles 24, 25 are disposed symmetrically with the pole pitch τ, exhibits marked amplitudes at the third and fifth harmonics, which lead to substantial torque rippling in the resultant torque of the modular unit. The second harmonic that is also present in the torque is not significant, since because of the 2-phase nature of the machine and the offset of the two modular units by 90 electrical degrees from one another, this second harmonic should not appear in the total torque of the machine. To compensate for the third and fifth harmonics, in the above-described exemplary embodiment of FIG. 2, from the total of 32 stator poles 24, 25 that are present, four identical stator pole groups 131–134 are formed (m=2, k=$2^2$=4). As shown in FIG. 3, these four stator pole groups 131–134 yield four pairs of stator pole groups (m·k/2=2·2=4) with the following pairings: stator pole group 131+132, stator pole group 133+134, stator pole group 131+133, and stator pole group 132+134. In the stator pole group pairs 131, 132 and 133, 134, the stator pole groups 131 and 132 and the stator pole groups 133 and 134 are each offset electrically from one another by 36° (ν=5, α=180°/ν=36°), while in the stator pole group pairs 131, 133 and 132, 134, the stator pole groups 131 and 133 and the stator pole groups 132 and 134 are displaced electrically by 60° from one another (ν=3, α=180°/3=60°). Thus the result, as shown in FIG. 2, is a displacement relative to the stator pole group 131 of the stator pole group 132 by 36° electrically, of the stator pole group 133 by 60° electrically, and of the stator pole group 134 by 96° electrically.

Figure 4:
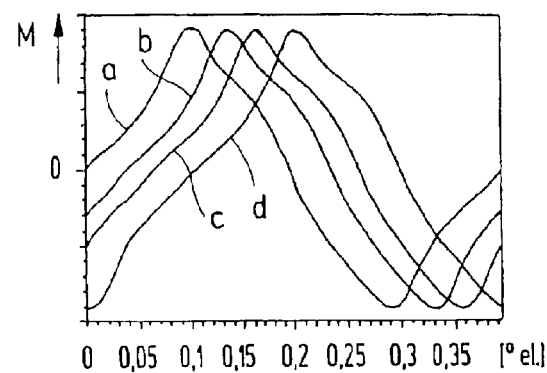
FIG. 4, a graph showing the torque course of the four stator groups, formed in the machine of FIG. 3, over an electrical angle of 360°.
Figure 5:
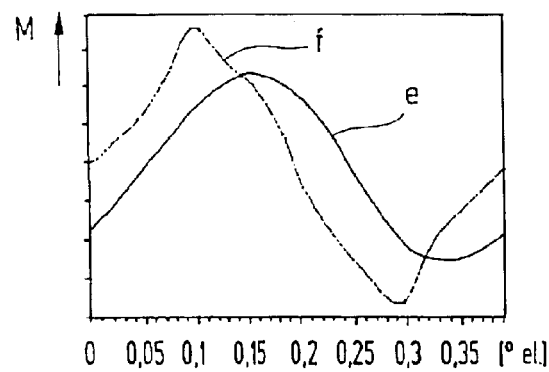
FIG. 5, a graph showing the resultant total torque in comparison with the graph of a machine with undisplaced stator pole groups.
Figure 6:
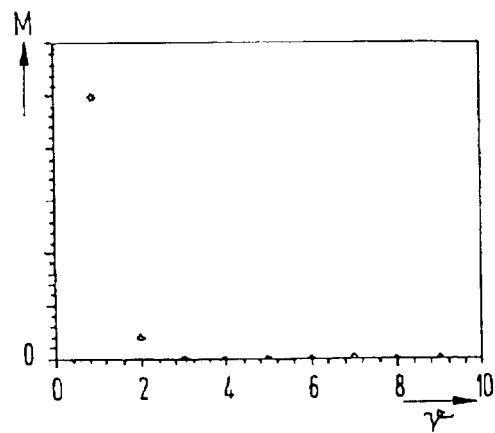
FIGS. 6 and 7, each, a graph of one of the amplitude spectra of the torques in FIG. 5.
Figure 7:
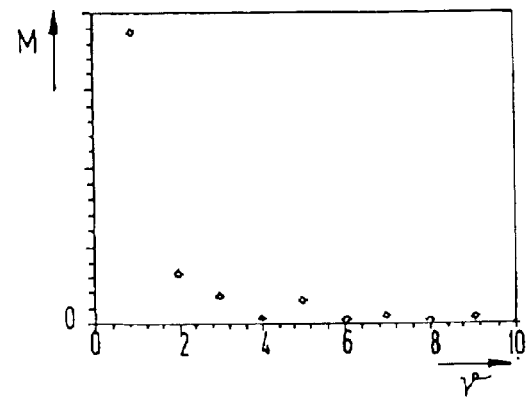

In FIG. 4, the torque course for the four stator pole groups 131–134 is shown over an electrical angle of 360°. Curve a shows the torque course for the stator pole group 131; curve b shows the torque course for the stator pole group 132; curve c shows the torque course for the stator pole group 133; and curve d shows the torque course for the stator pole group 134. In FIG. 5, the total torque of the modular unit that results from the summation of these curves a, b, c, d is marked e. In comparison with it, curve f shows the total torque of the modular unit with nondisplaced stator poles 24, 25. It can be seen clearly that after the described symmetrical displacement of the stator pole groups 131–134, the torque course is virtually sinusoidal, although the torque has dropped by approximately 25%. The amplitude spectrum, shown in FIG. 6, of the torque of curve e in FIG. 5 shows that the third and fifth harmonics, which are still present in the uncompensated modular unit (FIG. 7), are suppressed virtually completely.

If three harmonics are to be suppressed in the 32-pole unipolar transverse flux machine, then the 32 stator poles 24, 25 should be divided into a total of eight stator pole groups, each with four stator poles 24, 25 offset from one another by the pole pitch τ. These eight stator pole groups belong in alternation to a total of twelve pairs of stator pole groups. If the third, fifth and for instance ninth harmonics in the torque are to be suppressed, then in four of the pairs of stator pole groups, the two stator pole groups are electrically displaced from one another by 20° (α=180°/9=20°); in another four pairs of stator pole groups, the two stator pole groups are electrically displaced from one another by 36°; and in a third four pairs of stator pole groups, the two stator pole groups are electrically displaced from one another by 60°.

In FIGS. 8–12, a second possibility of reducing the harmonic content in the uncompensated unipolar transverse flux machine of FIG. 1 is illustrated. Here, instead of a symmetrical displacement of stator pole groups, an asymmetrical displacement of individual pairs of stator poles, each forming one magnetic circuit, is performed. This type of displacement of the stator poles 24, 25 requires merely an even number of stator poles 24, 25, and need not meet the condition $2^n$, where n is a whole number. Thus a harmonic reduction in the torque of a 50-pole or 36-pole unipolar transverse flux machine can for instance be achieved. Moreover, with this kind of compensation, the desired harmonics are not suppressed completely but instead can be reduced to a desired magnitude that is no longer perceptible in the total torque. It is equally possible for the drop in the fundamental oscillation amplitude that is unavoidably associated with the harmonic compensation to be limited to a desired value.

Figure 8:
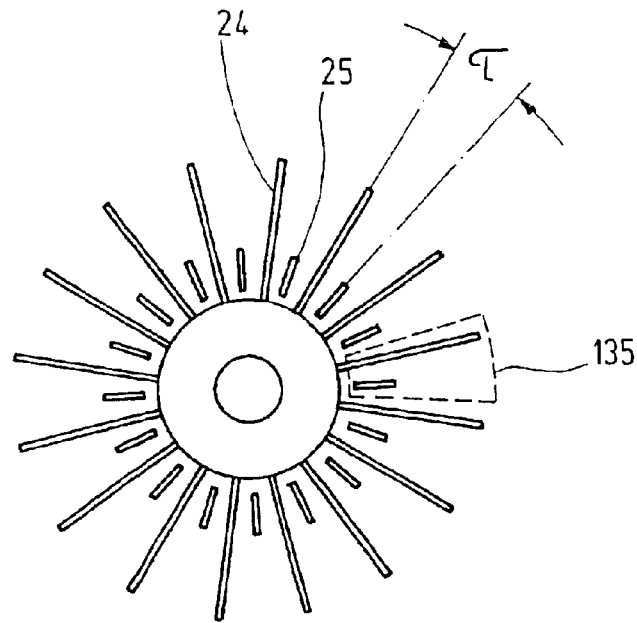
FIG. 8, a view identical to FIG. 2, for explaining a further exemplary embodiment of the unipolar transverse flux machine.

To explain the asymmetrical displacement of the stator pole pairs, FIG. 8 in turn schematically shows a modular unit with 32 stator poles 24, 25, in which all the stator poles 24, 25 are offset symmetrically from one another by a pole pitch τ. One stator pole 24 and one stator pole 25 each form one stator pole pair 135. To reduce one or more desired harmonics in the torque of the uncompensated machine, one stator pole pair or a plurality of stator pole pairs 135 are displaced from their symmetrical pole pitch by an electrical angle β. The size of the angle β is calculated such that the fundamental oscillation generated by the applicable stator pole pair 135 in the torque is greater than a predetermined upper value, and the torque proportions, which are due to the harmonics selected, does not exceed a predetermined upper value. The upper limits are defined such that for instance the amplitude of the harmonics amounts to less than 3% of the fundamental oscillation amplitude for an uncompensated machine, and furthermore, the fundamental oscillation amplitude is no less than 90% of the fundamental oscillation amplitude of the uncompensated machine. In the calculation of the torque for the various stator pole pairs 135 displaced by various angles β, there are many solutions that satisfy the combinational mathematics equation $$N_{ges} = \binom{N_P + N_W - 1}{N_P}$$

in which $N_P$ is the number of stator poles 24, 25, and $N_W$ is the number of possible angular positions. From this number $N_{ges}$ of possible solutions, those solutions that meet the aforementioned upper limits, or in other words effect an at least 90% fundamental oscillation amplitude with simultaneous reduction of the amplitudes of the harmonics, preferably with third and fifth harmonics, to below 3%.

Figure 9:
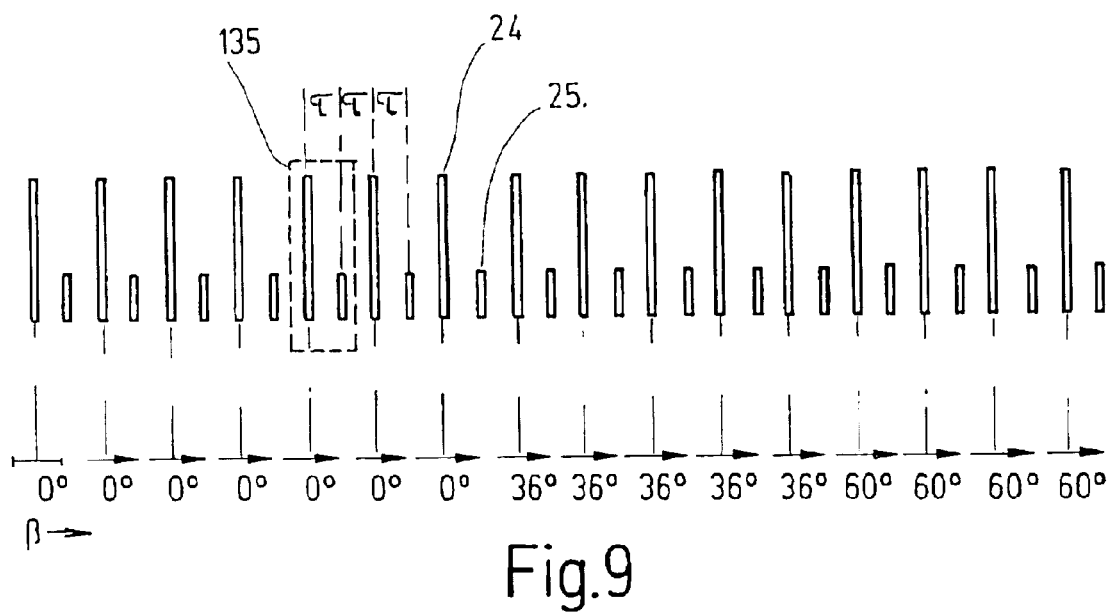
FIG. 9, a diagram showing the disposition of the stator poles in the stator module of FIG. 8, to explain the displacement of the stator pole pairs.
Figure 10:
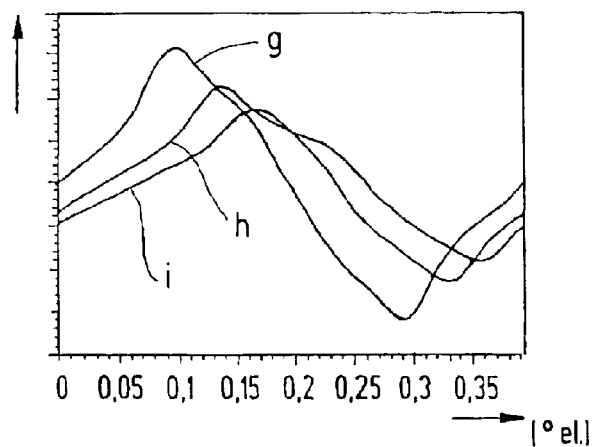
FIG. 10, a graph showing the torque courses of three stator groups of a total of sixteen pairs of stator pole groups.
Figure 11:
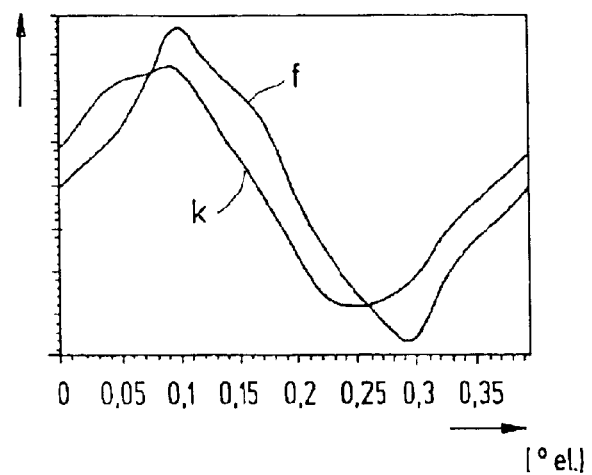
FIG. 11, a graph showing the resultant total torque of FIG. 10 in comparison with the torque with stator pole pairs that are not displaced.
Figure 12:
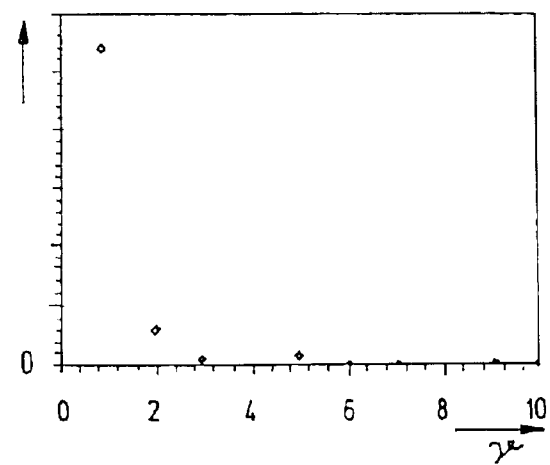
FIG. 12, a graph showing the amplitude spectrum of the resultant total torque in FIG. 11.

In the exemplary embodiment, illustrated in FIGS. 8–12, of a 32-pole unipolar transverse flux machine, one of these possible solutions is the following: for seven stator pole pairs 135, a displacement angle β=0° electrically; for five stator pole pairs 135, β=36° electrically; and for four stator pole pairs 135, β=60° electrically. This displacement of the stator pole pairs 135 relative to the uniform pole pitch τ is shown in FIG. 9. Accordingly, the first seven stator poles 135 in order are not displaced; that is, they stay in their symmetrical position as in the uncompensated machine; the next five stator pole pairs 135 are displaced 36° electrically relative to the symmetrical pole pitch τ; and the next four stator pole pairs are displaced 60° electrically from the symmetrical pole pitch τ. Curve g in the graph of FIG. 10 shows the summed-up torque course of the seven undisplaced stator pole pairs 135; curve h shows the summed-up torque course of the five stator pole pairs 135 displaced electrically by 36°; and curve i shows the torque course of the four stator pole pairs 135 displaced electrically by 60°. The resultant torque of the modular unit is shown in curve k in FIG. 11. For comparison, in FIG. 11, the torque course of the uncompensated modular unit is shown in curve f. Once again it can be seen that the torque course is made to conform much more closely to the sinusoidal form. The amplitude spectrum of the torque in FIG. 12 shows that the amplitudes of the third and fifth harmonics are much less than in the uncompensated machine (see FIG. 7) and amount to less than 3% of the uncompensated fundamental oscillation amplitude. Moreover, the amplitude of the torque has not dropped below 90% of the amplitude of the torque of the uncompensated machine.

Once again, the second harmonic (FIG. 12) that is still present in the torque of the modular unit can be left out of consideration, since as already noted above, the second harmonic is largely compensated for by the second modular unit, with its 90° displacement.

The foregoing relates to preferred exemplary embodiments of the invention, it being understood that other variants and embodiments thereof are possible within the spirit and scope of the invention, the latter being defined by the appended claims.

We claim:
1. A unipolar transverse flux machine, comprising
a rotor (12) which is rotatable about a rotor axis and including at least one rotor module (15) composed of two coaxial, axially spaced-apart, ferromagnetic rotor rings (16, 17) having teeth over their outer circumference with a constant tooth pitch,
a permanent magnet ring mounted between the rotor rings (16, 17), the magnet ring magnetized in unipolar fashion in the direction of the rotor axis,
a stator (11) surrounding the rotor (12) concentric with the rotor axis, the stator (11) including at least one stator module (14) associated with each rotor module (15) and having a number, corresponding to twice the number of ring teeth, of preferably laminated, yokelike stator poles (24, 25), the stator poles being offset from one another in the circumferential direction by a pole pitch (τ) and which with their two yoke legs are radially opposite the two rotor rings (16, 17), leaving an air gap,
an annular coil (23), disposed between the legs of the stator poles coaxially to the rotor axis, for generating a magnetic flux in the stator poles (24, 25),
the number of stator poles (24, 25) in each stator module being $2^n$, where n is a whole number, and
at least one pair of stator pole groups (131–134) having the same number of stator poles (24, 25) is formed, which are displaced relative to one another by an electrical angle α=180°/ν, where ν is the ordinal number of the harmonic that is suppressed in the torque.

2. The unipolar transverse flux machine of claim 1, wherein for a number m of suppressed harmonics in the torque, $k=2^m$ identical stator pole groups (131–134) form m·k/2 stator pole group pairs (131/132, 133/134, 131/133, 132/134), and each stator pole group (131–134) is a member of m pairs of different electrical displacement (α).

3. The unipolar transverse flux machine comprising
a rotor (12) which is rotatable about a rotor axis and including at least one rotor module (15) composed of two coaxial, axially spaced-apart, ferromagnetic rotor rings (16, 17) having teeth over their outer circumference with a constant tooth pitch,
a permanent magnet ring mounted between the rotor rings (16, 17), the magnet ring magnetized in unipolar fashion in the direction of the rotor axis,
a stator (11) surrounding the rotor (12) concentric with the rotor axis, the stator (11) including at least one stator module (14) associated with each rotor module (15) and having a number, corresponding to twice the number of ring teeth, of preferably laminated, yokelike stator poles (24, 25), the stator poles being offset from one another in the circumferential direction by a pole pitch (τ) and which with their two yoke legs are radially opposite the two rotor rings (16, 17), leaving an air gap, and which has an annular coil (23), disposed between the legs of the stator poles coaxially to the rotor axis, for generating a magnetic flux in the stator poles (24, 25), each stator module (14) having an even number of stator poles (24, 25), and at least one pair of stator poles (24, 25), belonging to one magnetic circuit and offset from one another by a pole pitch (τ), is displaced out of the symmetrical pole pitch (τ) by an angle (β) such that the fundamental oscillation amplitude in the resultant outset torque of the modular unit is greater than a predetermined upper value, and the amplitude of at least one selected harmonic does not exceed a predetermined upper value.

4. The unipolar transverse flux machine of claim 3, wherein the upper value of the harmonic amplitude in the torque is below a required percentage of the fundamental oscillation amplitude, for symmetrically disposed stator poles (24, 25) offset by a pole pitch (τ).

5. The unipolar transverse flux machine of claim 3, wherein the upper value of the harmonic amplitude in the torque is above a required percentage of the fundamental oscillation amplitude, for symmetrically disposed stator poles (24, 25) offset by a pole pitch (τ).

6. The unipolar transverse flux machine of claim 4, wherein the upper value of the harmonic amplitude in the torque is above a required percentage of the fundamental oscillation amplitude, for symmetrically disposed stator poles (24, 25) offset by a pole pitch (τ).

7. The unipolar transverse flux machine of claim 3, wherein a plurality of stator pole pairs (24, 25) are displaced by at least an equal angle (β).

8. The unipolar transverse flux machine of claim 4, wherein a plurality of stator pole pairs (24, 25) are displaced by at least an equal angle (β).

9. The unipolar transverse flux machine of claim 5, wherein a plurality of stator pole pairs (24, 25) are displaced by at least an equal angle (β).

10. The unipolar transverse flux machine of claim 6, wherein a plurality of stator pole pairs (24, 25) are displaced by at least an equal angle (β).

11. The unipolar transverse flux machine of claim 3, wherein the calculation of the displacement angle (β) is performed for a single stator module (14).

12. The unipolar transverse flux machine of claim 4, wherein the calculation of the displacement angle (β) is performed for a single stator module (14).

13. The unipolar transverse flux machine of claim 5, wherein the calculation of the displacement angle (β) is performed for a single stator module (14).

14. The unipolar transverse flux machine of claim 6, wherein the calculation of the displacement angle (β) is performed for a single stator module (14).

15. The unipolar transverse flux machine of claim 7, wherein the calculation of the displacement angle (β) is performed for a single stator module (β).

16. The unipolar transverse flux machine of claim 8, wherein the calculation of the displacement angle (β) is performed for a single stator module (14).

17. The unipolar transverse flux machine of claim 9, wherein the calculation of the displacement angle (β) is performed for a single stator module (14).

18. The unipolar transverse flux machine of claim 10, wherein the calculation of the displacement angle (β) is performed for a single stator module (14).

19. The unipolar transverse flux machine of claim 1, wherein the stator (11) has two identical stator modules (14), disposed axially side by side, and the associated two rotor modules (15) are seated axially side by side on a rotor shaft (13) in a manner fixed against relative rotation, and that the stator modules or rotor modules (14, 15) are rotated electrically 90° from one another.

20. The unipolar transverse flux machine of claim 3, wherein the stator (11) has two identical stator modules (14), disposed axially side by side, and the associated two rotor modules (15) are seated axially side by side on a rotor shaft (13) in a manner fixed against relative rotation, and that the stator modules or rotor modules (14, 15) are rotated electrically 90° from one another.

* * * * *